United States Patent
Carraux et al.

(10) Patent No.: US 8,504,372 B2
(45) Date of Patent: *Aug. 6, 2013

(54) DISTRIBUTED SPEECH RECOGNITION USING ONE WAY COMMUNICATION

(75) Inventors: Eric Carraux, Pittsburgh, PA (US); Detlef Koll, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/563,998

(22) Filed: Aug. 1, 2012

(65) Prior Publication Data

US 2012/0296645 A1    Nov. 22, 2012

Related U.S. Application Data

(63) Continuation of application No. 13/196,188, filed on Aug. 17, 2011, now Pat. No. 8,249,878, which is a continuation of application No. 12/550,381, filed on Aug. 30, 2009, now Pat. No. 8,019,608.

(60) Provisional application No. 61/093,221, filed on Aug. 29, 2008.

(51) Int. Cl.
    *G10L 15/22*    (2006.01)

(52) U.S. Cl.
    USPC ................. 704/270.1; 704/251; 704/275

(58) Field of Classification Search
    None
    See application file for complete search history.

(56) References Cited

U.S. PATENT DOCUMENTS

| | | |
|---|---|---|
| 6,298,326 B1 | 10/2001 | Feller |
| 6,963,837 B1 | 11/2005 | Finke |
| 7,016,844 B2 | 3/2006 | Othmer |
| 7,444,285 B2 | 10/2008 | Forbes |
| 7,502,741 B2 | 3/2009 | Finke |
| 7,539,086 B2 | 5/2009 | Jaroker |
| 7,584,103 B2 | 9/2009 | Fritsch |
| 7,640,158 B2 | 12/2009 | Detlef |
| 7,716,040 B2 | 5/2010 | Koll |
| 7,844,464 B2 | 11/2010 | Schubert |
| 7,933,777 B2 | 4/2011 | Koll |
| 2003/0152093 A1 | 8/2003 | Gupta |
| 2004/0064317 A1 | 4/2004 | Othmer |
| 2005/0086059 A1 | 4/2005 | Bennett |
| 2005/0102140 A1 | 5/2005 | Davne |
| 2005/0114129 A1 | 5/2005 | Watson |
| 2006/0041428 A1 | 2/2006 | Fritsch |
| 2006/0074656 A1 | 4/2006 | Mathias |

(Continued)

OTHER PUBLICATIONS

"Dictaphone ichart Dictate" web site, visited on Dec. 13, 2006.

(Continued)

*Primary Examiner* — Talivaldis Ivars Smits
(74) *Attorney, Agent, or Firm* — Robert Plotkin, P.C.

(57) ABSTRACT

A speech recognition client sends a speech stream and control stream in parallel to a server-side speech recognizer over a network. The network may be an unreliable, low-latency network. The server-side speech recognizer recognizes a first portion of the speech stream and, if a predetermined criterion is satisfied by the speech recognition result, waits until the speech recognizer has been reconfigured before recognizing a second portion of the speech stream. The speech recognition client receives recognition results from the server-side recognizer in response to requests from the client. The client may remotely reconfigure the state of the server-side recognizer during recognition.

12 Claims, 6 Drawing Sheets

U.S. PATENT DOCUMENTS

| | | |
|---|---|---|
| 2007/0299652 A1 | 12/2007 | Koll |
| 2007/0299665 A1 | 12/2007 | Koll |
| 2009/0048833 A1 | 2/2009 | Fritsch |
| 2009/0132239 A1 | 5/2009 | Finke |
| 2010/0076761 A1 | 3/2010 | Juergen |
| 2010/0299135 A1 | 11/2010 | Fritsch |
| 2012/0304056 A1 | 11/2012 | Detlef |

OTHER PUBLICATIONS

"Dictaphone Powerscribe Workstation" web site, visited on Nov. 7, 2006.

Dictaphone Healthcare Solutions Datasheet, date unknown.

Dictaphone iChart Datasheet, date unknown.

Dictaphone iChart Recognition Web Site, vwww.nuance.com/ichart, visited on Jul. 3, 2007.

Dictaphone Speech Recognition Datasheet, date unknown.

| SPEECH DATA | START TIME | END TIME | TAG | UID |
|---|---|---|---|---|
| | | | | |
| | | | | |
| | | | | |

FIG. 3

| COMMAND | CONFIG. OBJ. | TIMEOUT |
|---|---|---|
| | | |
| | | |

FIG. 4

DISTRIBUTED SPEECH RECOGNITION USING ONE WAY COMMUNICATION

CROSS-REFERENCE TO RELATED APPLICATIONS

This application is a continuation of U.S. patent application Ser. No. 13/196,188, filed on Aug. 17, 2011, now U.S. Pat. No. 8,249,878 entitled, "Distributed Speech Recognition Using One Way Communication"; which is a continuation of U.S. patent application Ser. No. 12/550,381, filed on Aug. 30, 2009, entitled, "Distributed Speech Recognition Using One Way Communication" (now U.S. Pat. No. 8,019,608, issued on Sep. 13, 2011); which claims priority from U.S. Prov. Pat. App. Ser. No. 61/093,221, filed on Aug. 29, 2008, entitled, "Distributed Speech Recognition Using One Way Communication"; all of which are hereby incorporated by reference herein.

BACKGROUND

A variety of automatic speech recognizers (ASRs) exist for performing functions such as converting speech into text and controlling the operations of a computer in response to speech. Some applications of automatic speech recognizers require shorter turnaround times (the amount of time between when the speech is spoken and when the speech recognizer produces output) than others in order to appear responsive to the end user. For example, a speech recognizer that is used for a "live" speech recognition application, such as controlling the movement of an on-screen cursor, may require a shorter turnaround time (also referred to as a "response time") than a speech recognizer that is used to produce a transcript of a medical report.

The desired turnaround time may depend, for example, on the content of the speech utterance that is processed by the speech recognizer. For example, for a short command-and-control utterance, such as "close window," a turnaround time above 500 ms may appear sluggish to the end user. In contrast, for a long dictated sentence which the user desires to transcribe into text, response times of 1000 ms may be acceptable to the end user. In fact, in the latter case users may prefer longer response times because they may otherwise feel that their speech is being interrupted by the immediate display of text in response to their speech. For longer dictated passages, such as entire paragraphs, even longer response times of multiple seconds may be acceptable to the end user.

In typical prior art speech recognition systems, increasing response time while maintaining recognition accuracy requires increasing the computing resources (processing cycles and/or memory) that are dedicated to performing speech recognition. As a result, many applications which require fast response times require the speech recognition system to execute on the same computer as that on which the applications themselves execute. Although such colocation may eliminate the delay that would otherwise be introduced by requiring the speech recognition results to be transmitted to the requesting application over a network, such colocation also has a variety of disadvantages.

For example, colocation requires a speech recognition system to be installed on every end user device—such as every desktop computer, laptop computer, cellular telephone, and personal digital assistant (PDA)—which requires speech recognition functionality. Installing and maintaining such speech recognition systems on such a large number and wide variety of devices can be tedious and time-consuming for end users and system administrators. For example, such maintenance requires system binaries to be updated when a new release of the speech recognition system becomes available. User data, such as speech models, are created and accumulated over time on individual devices, taking up precious storage space, and need to be synchronized with multiple devices used by the same user. Such maintenance can grow particularly burdensome as users continue to use speech recognition systems on a wider number and variety of devices.

Furthermore, locating a speech recognition system on the end user device causes the speech recognition system to consume precious computing resources, such as CPU processing cycles, main memory, and disk space. Such resources are particularly scarce on handheld mobile devices such as cellular telephones. Producing speech recognition results with fast turnaround times using such devices typically requires sacrificing recognition accuracy and reducing the resources available to other applications executing on the same device.

One known technique for overcoming these resource constraints in the context of embedded devices is to delegate some or all of the speech recognition processing responsibility to a speech recognition server that it located remotely from the embedded device and which has significantly greater computing resources than the embedded device. When a user speaks into the embedded device in this situation, the embedded device does not attempt to recognize the speech using its own computing resources. Instead, the embedded device transmits the speech (or a processed form of it) over a network connection to the speech recognition server, which recognizes the speech using its greater computing resources and therefore produces recognition results more quickly than the embedded device could have produced with the same accuracy. The speech recognition server then transmits the results back over the network connection to the embedded device. Ideally this technique produces highly-accurate speech recognition results more quickly than would otherwise be possible using the embedded device alone.

In practice, however, this "server-side speech recognition" technique has a variety of shortcomings. In particular, because server-side speech recognition relies on the availability of high-speed and reliable network connections, the technique breaks down if such connections are not available when needed. For example, the potential increases in speed made possible by server-side speech recognition may be negated by use of a network connection without sufficiently high bandwidth. As one example, the typical network latency of an HTTP call to a remote server can range from 100 ms to 500 ms. If spoken data arrives at a speech recognition server 500 ms after it is spoken, it will be impossible for that server to produce results quickly enough to satisfy the minimum turnaround time (500 ms) required by command-and-control applications. As a result, even the fastest speech recognition server will produce results that appear sluggish if used in combination with a slow network connection.

Furthermore, conventional server-side speech recognition techniques assume that the network connection established between the client (e.g., embedded device) and speech recognition server is kept alive continuously during the entire recognition process. Although it may be possible to satisfy this condition in a Local Area Network (LAN) or when both client and server are managed by the same entity, this condition may be impossible or at least unreasonable to satisfy when the client and server are connected over a Wide Area Network (WAN) or the Internet, in which case interruptions to the network connection may be common and unavoidable.

Furthermore, organizations often restrict the kinds of communications that their users can engage in over public networks such as the Internet. For example, organizations may only allow clients within their networks to engage in outbound communications. This means that a client can contact an external server on a certain port, but that the server cannot initiate contact with the client. This is an example of one-way communication.

Another common restriction imposed on clients is that they may only use a limited range of outbound ports to communicate with external servers. Furthermore, outgoing communication on those ports may be required to be encrypted. For example, clients often are allowed to use only the standard HTTP port (port 80) or the standard secure, encrypted HTTPS port (port 443).

What is needed, therefore, are improved techniques for producing speech recognition results with fast response times without overburdening the limited computing resources of client devices.

SUMMARY

A speech recognition client sends a speech stream and control stream in parallel to a server-side speech recognizer over a network. The network may be an unreliable, low-latency network. The server-side speech recognizer recognizes the speech stream continuously. The speech recognition client receives recognition results from the server-side recognizer in response to requests from the client. The client may remotely reconfigure the state of the server-side recognizer during recognition.

Other features and advantages of various aspects and embodiments of the present invention will become apparent from the following description and from the claims.

BRIEF DESCRIPTION OF THE DRAWINGS

FIG. 3 is a diagram of a speech stream according to one embodiment of the present invention; and FIG. 4 is a diagram of a command and control stream according to one embodiment of the present invention.

DETAILED DESCRIPTION

Figure 1:
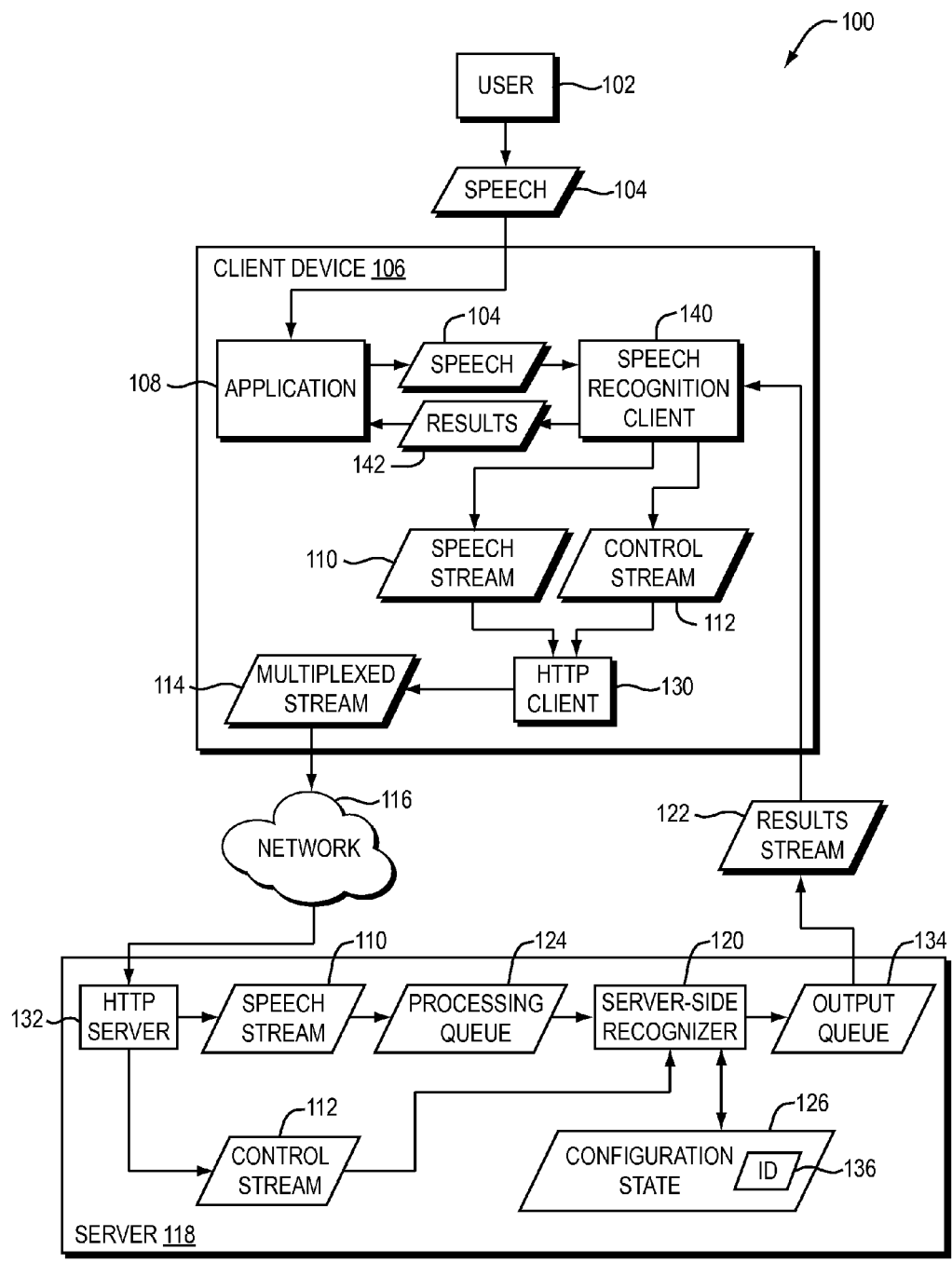
FIG. 1 is a dataflow diagram of a system for performing speech recognizing over a low-latency network according to one embodiment of the present invention.
Figure 2A:
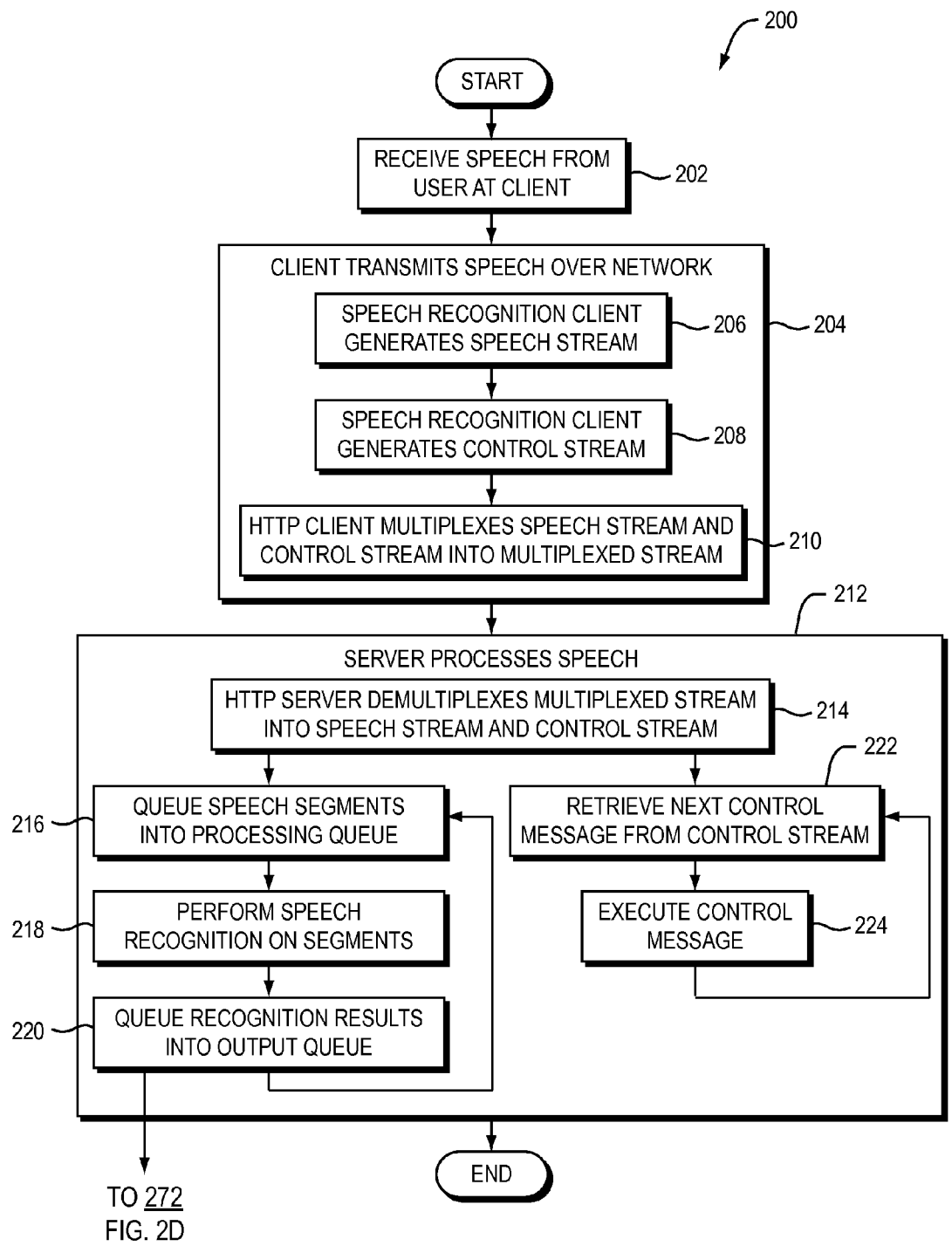
FIG. 2A is a flowchart of a method performed by the system of FIG. 1 according to one embodiment of the present invention.

Referring to FIG. 1, a dataflow diagram is shown of a speech recognition system 100 according to one embodiment of the present invention. Referring to FIG. 2A, a flowchart is shown of a method 200 performed by the system 100 of FIG. 1 according to one embodiment of the present invention.

A user 102 of a client device 106 speaks and thereby provides speech 104 to the client device 106 (step 202). The client device 106 may be any device, such as a desktop or laptop computer, cellular telephone, personal digital assistant (PDA), or telephone. Embodiments of the present invention, however, are particularly useful in conjunction with resource-constrained clients, such as computers or mobile computing devices with slow processors or small amounts of memory, or computers running resource-intensive software. The device 106 may receive the speech 104 from the user 102 in any way, such as through a microphone connected to a sound card. The speech 104 may be embodied in an audio signal which is tangibly stored in a computer-readable medium and/or transmitted over a network connection or other channel. The speech 104 may, for example, include multiple audio streams, as in the case of "push to talk" applications, in which each push initiates a new audio stream.

The client device 106 includes an application 108, such as a transcription application or other application which needs to recognize the speech 104. Although the application 108 may be any kind of application that uses speech recognition results, assume for purposes of the following discussion that the application 108 is a "live" recognition application for transcribing speech. Portions of the speech 104 provided by the user 102 in this context may fall into one of two basic categories: dictated speech to be transcribed (e.g., "The patient is a 35 year-old male") or commands (such as "delete this" or "sign and submit").

The client device 106 also includes a speech recognition client 140. Although the speech recognition client 140 is shown in FIG. 1 as a separate module from the application 108, alternatively the speech recognition client 140 may be part of the application 108. The application 108 provides the speech 104 to the speech recognition client 140. Alternatively, the application 108 may process the speech 104 in some way and provide the processed version of the speech 104, or other data derived from the speech, to the speech recognition client 140. The speech recognition client 140 itself may process the speech 104 (in addition to or instead of any processing performed on the speech by the application 108) in preparation for transmitting the speech 104 for recognition.

The speech recognition client 140 transmits the speech 104 over a network 116 to a server-side speech recognition engine 120 located on a server 118 (step 204). Although the client 140 may transmit the entire speech 104 to the server 118 using a single server configuration, doing so may produce suboptimal results. To improve recognition accuracy or change the context of the speech recognition engine 120, the client 140 may instead reconfigure the speech recognition engine 120 at various points during transmission of the speech 104, and therefore at various points during the speech recognition engine's recognition of the speech 104. In general, configuration commands transmitted by the client 140 to the speech recognition engine 120 set the expectations of the recognizer 120 regarding the context and/or content of the speech that is to follow. Various prior art systems perform this configuration function by configuring the server-side recognition engine with an initial configuration, then sending some of the speech to the server, then reconfiguring the server-side recognition engine, then sending more of the speech, and so on. This enables the server-side recognition engine to recognize different portions of the speech with configurations and in contexts that are designed to produce better results for later portions of the speech than would have been produced using the initial configuration.

It is undesirable, however, to require the speech recognition client 140 to wait to receive an acknowledgement from the server 118 that the previous reconfiguration command has been processed by the server 118 before sending the next portion of the speech 104 to the server 118, because such a requirement could introduce a significant delay into the recognition of the speech 104, particularly if the network connection is slow and/or unreliable. It is also undesirable to stop server-side processing of the speech until the server receives instructions from the client-side application 108 on how to process subsequent speech. In prior art systems, however, the server needs to stop processing speech until it receives such instructions, such as reconfiguration commands, from the client.

Embodiments of the present invention address these and other problems as follows. The speech recognition client 140 transmits the speech 104 to the server 118 in a speech stream 110 over the network 116 (FIG. 2, step 204). As shown in FIG. 3, the speech stream 110 may be divided into segments 302a-e, each of which may represent a portion of the speech 104 (e.g., 150-250 ms of the speech 104). Sending the speech 104 in segments enables the speech recognition client 140 to transmit portions of the speech 104 to the server 118 relatively soon after those portions become available to the speech recognition client 140, thereby enabling the recognizer 120 to begin recognizing those portions with minimal delay. The application 108 may, for example, send the first segment 302a immediately after it becomes available, even as the second segment 302b is being generated. Furthermore, the client 140 may transmit individual portions in the speech stream 110 to the server 118 without using a standing connection (e.g., socket). As a result, a connectionless or stateless protocol, such as HTTP, may be used by the speech recognition client 140 to transmit the speech stream 110 to the server 118.

Although only five representative segments 302a-e are shown in FIG. 2A for ease of illustration, in practice the speech stream 110 may contain any number of segments, which may grow as the user 102 continues to speak. The application 108 may use any procedure to divide the speech 104 into segments, or to stream the speech 104 to the server 118 over, for example, an HTTP connection.

Each of the speech segments 302a-e contains data 304a representing a corresponding portion of the speech 104 of the user 102. Such speech data 304a may be represented in any appropriate format. Each of the speech segments 302a-e may contain other information, such as the start time 304b and end time 304c of the corresponding speech data 304a, and a tag 304d which will be described in more detail below. The particular fields 304a-d illustrated in FIG. 3 are merely examples and do not constitute limitations of the present invention.

In general, the server-side recognizer 120 queues segments from the speech stream 110 into a first-in first-out processing queue 124 at the server 118 (FIG. 2, step 216). With certain exceptions that will be described in more detail below, the server-side recognizer 120 pulls segments from the processing queue 124 as soon as possible after they become available and performs speech recognition on those segments to produce speech recognition results (step 218), which the server 120 queues into a first-in first-out output queue 134 (step 220).

The application 108, through the speech recognition client 140, may also send a control stream 112 to the server-side recognizer 120 over the network 116 as part of step 204. As shown in FIG. 4, the control stream 112 may include control messages 402a-c, transmitted in sequence to the recognizer 120. Although only three representative control messages 402a-c are shown in FIG. 4 for ease of illustration, in practice the control stream 112 may contain any number of control messages. As will be described in more detail below, each of the control messages 402a may contain a plurality of fields, such as a command field 404a for specifying a command to be executed by the server-side recognizer 120, a configuration object field 404b for specifying a configuration object, and a timeout value field 404c for specifying a timeout value. The particular fields 304a-d illustrated in FIG. 3 are merely examples and do not constitute limitations of the present invention.

As shown in FIG. 1, the speech recognition client 140 may treat the speech stream 110 and control stream 112 as two different streams of data (steps 206 and 208), transmitted in parallel from the speech recognition client 140 to the engine 120. However, assuming that only one output port is available to the speech recognition client 140 for communicating with the server 118, the client 106 may multiplex the speech stream 110 and the control stream 112 into a single data stream 114 transmitted to the server 118 (step 210). The server 118 demultiplexes the signal 114 into its constituent speech stream 110 and control stream 112 on the server side (step 214).

Any multiplexing scheme may be used. For example, if HTTP is used as a transport mechanism, then an HTTP client 130 and HTTP server 132 may transparently perform the multiplexing and demultiplexing functions, respectively, on behalf of the client 106 and server 118. In other words, the speech recognition client 140 may treat the speech stream 110 and control stream 112 as two separate streams even though they are transmitted as a single multiplexed stream 114 because the HTTP client 130 multiplexes these two streams together automatically and transparently on behalf of the speech recognition client 140. Similarly, the server-side recognizer 120 may treat the speech stream 110 and control stream 112 as two separate streams even though they are received by the server 118 as a single multiplexed stream 114 because the HTTP server 132 demultiplexes the combined stream 114 into two streams automatically and transparently on behalf of the server-side recognizer 120.

As mentioned above, by default the server-side recognizer 120 pulls speech segments from the processing queue 124 in sequence, performs speech recognition on them, and queues the speech recognition results into the output queue 134. The speech recognition client 108 receives the speech recognition results as follows. The speech recognition client 140 sends, in the control stream 112, a control message whose command field 404a calls a method referred to herein as "DecodeNext." This method takes as parameters a configuration update object 404b (which specifies how a configuration state 126 of the server-side recognizer 120 is to be updated), and a real-time timeout value 404c. Although the speech recognition client 140 may send other commands in the control stream 112, only the DecodeNext command will be described here for ease of explanation.

The server-side recognizer 120 pulls control messages from the control stream 112 in sequence, as soon as possible after they are received, and in parallel with processing the speech segments in the speech stream 110 (step 222). The server-side recognizer 120 executes the command in each control message in sequence (step 224).

Figure 2B:
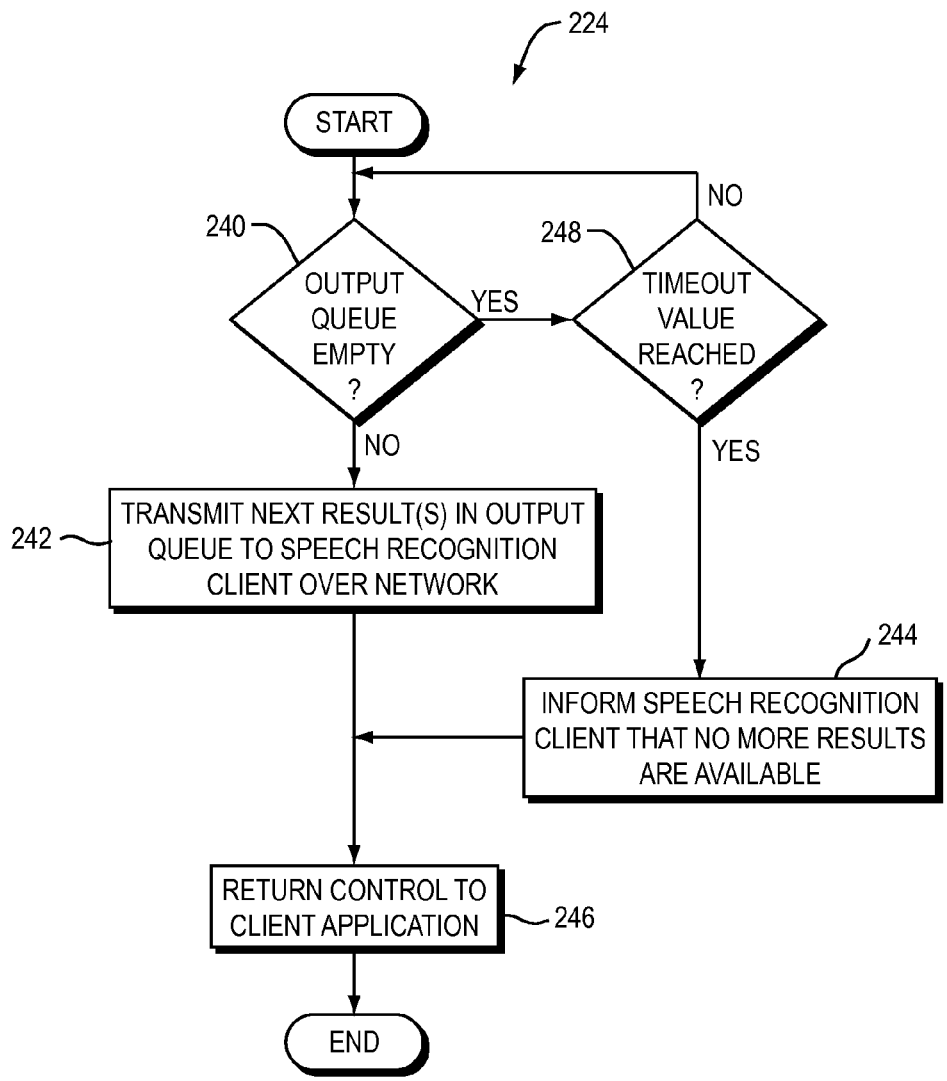
FIG. 2B is a flowchart of a method performed by a server-side automatic speech recognizer to recognize a segment of speech according to one embodiment of the present invention.

Referring to FIG. 2B, a flow chart is shown of a method performed by the server-side recognizer 120 to execute a DecodeNext control message in the control stream 112. If at least one speech recognition result is in the output queue 134 (step 240), the recognizer 120 sends the next result(s) 122 in the queue 134 to the speech recognition client 140 over the network 116 (step 242). If more than one result is available in the queue 134 at the time step 242 is performed, then all available results in the queue 134 are transmitted in the results stream 122 to the speech recognition client 140. (Although the results 122 are shown in FIG. 1 as being transmitted directly from the recognizer 120 to the speech recognition client 140 for ease of illustration, the results 122 may be transmitted by the HTTP server 132 over the network 116 and received by the HTTP client 130 at the client device 106.) The DecodeNext method then returns control to the application 108 (step 246), and terminates.

Recall that the recognizer 120 is continuously performing speech recognition on the speech segments in the processing queue 124. Therefore, if the output queue 134 is empty when the recognizer 120 begins to execute the DecodeNext method, the DecodeNext method blocks until at least one result (e.g., one word) is available in the output queue 134, or until the amount of time specified by the timeout value 404c is reached (step 248). If a result appears in the output queue 134 before the timeout value 404c is reached, then the DecodeNext method transmits that result to the speech recognition client 140 (step 242), returns control to the speech recognition client 140 (step 246), and terminates. If no results appear in the output queue 134 before the timeout value 404c is reached, then the DecodeNext method informs the speech recognition client 140 that no results are available (step 244), returns control to the speech recognition client 140 (step 246), and terminates without returning any recognition results to the speech recognition client 140.

Once control returns to the speech recognition client 140 (after the DecodeNext method either returns a recognition result to the speech recognition client 140 or informs the speech recognition client 140 that no such results are available), the speech recognition client 140 may immediately send another DecodeNext message to the server 120 in an attempt to receive the next recognition result. The server 120 may process this DecodeNext message in the manner described above with respect to FIG. 2B. This process may repeat for subsequent recognition results. As a result, the control stream 112 may essentially always be blocking on the server side (in the loop represented by steps 240 and 248 in FIG. 2B), waiting for recognition results and returning them to the client application 108 as they become available.

The timeout value 404c may be chosen to be shorter than the timeout value of the underlying communication protocol used between the client 140 and server 120, such as the HTTP timeout value. As a result, if the client 140 receives notification from the server that no speech recognition results were produced before the timeout value 404c was reached, the client 140 may draw the conclusion that the timeout was the result of the inability of the server 120 to produce any speech recognition results before the timeout value 404c was reached, rather than as the result of a network communication problem. Regardless of the reason for the timeout, however, the client 140 may send another DecodeNext message to the server 120 after such a timeout.

The examples described above involve two fully unsynchronized data streams 110 and 112. However, it may be desirable to perform certain kinds of synchronization on the two streams 110 and 112. For example, it may be useful for the speech recognition client 140 to ensure that the recognizer 120 is in a certain configuration state before beginning to recognize the speech stream 110. For example, the recognizer 120 may use the textual context of the current cursor position in a text edit window to guide recognition for text that is to be inserted at that cursor position. Since the cursor position may change frequently due to mouse or other keyboard events, it may be useful for the application 108 to delay transmission of the text context to the server 120 until the user 102 presses the "start recording" button. In this case, the server-side recognizer 120 must be prevented from recognizing speech transmitted to the server 120 until the correct text context is received by the server 120 and the server 120 updates its configuration state 126 accordingly.

As another example, some recognition results may trigger the need to change the configuration state 126 of the recognizer 120. As a result, when the server-side recognizer 120 generates such a result, it should wait until it is reconfigured before generating the next result. For example, if the recognizer 120 produces the result, "delete all," the application 108 may next attempt to verify the user's intent by prompting the user 102 as follows: "Do you really want to delete all? Say YES or NO." In this case, the application 108 (through the speech recognition client 140) should reconfigure the recognizer 120 with a "YES|NO" grammar before the recognizer 120 attempts to recognize the next segment in the speech stream 110.

Figure 2C:
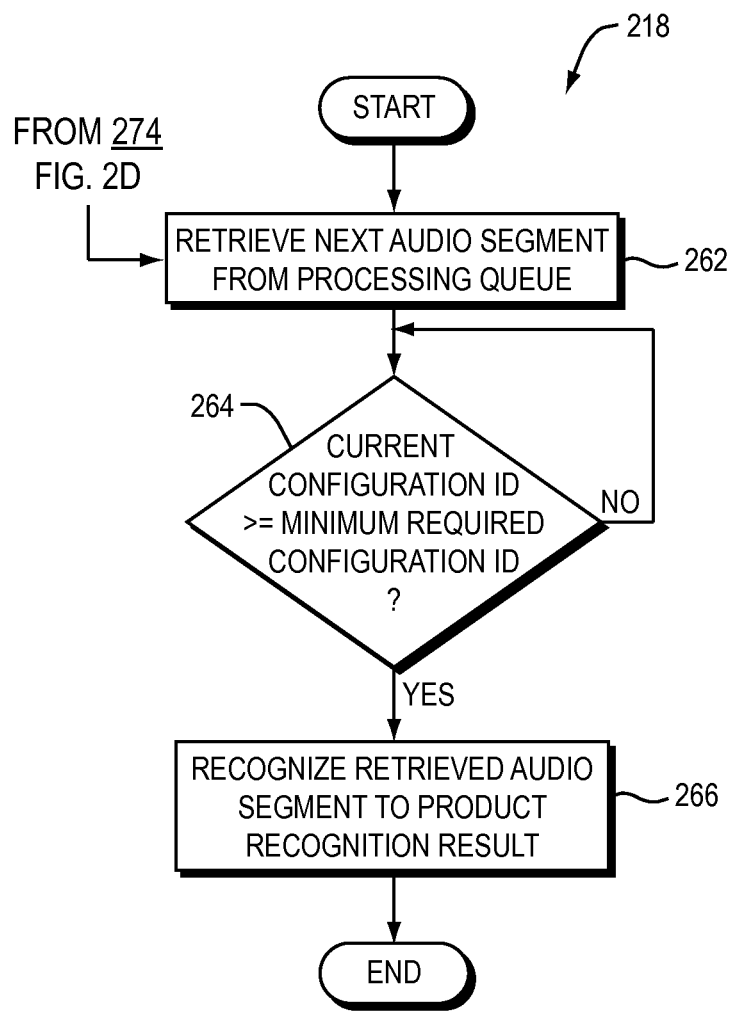
FIG. 2C is a flowchart of a method performed by a server-side automatic speech recognizer as part of performing speech recognition on segments of speech according to one embodiment of the present invention.
Figure 2D:
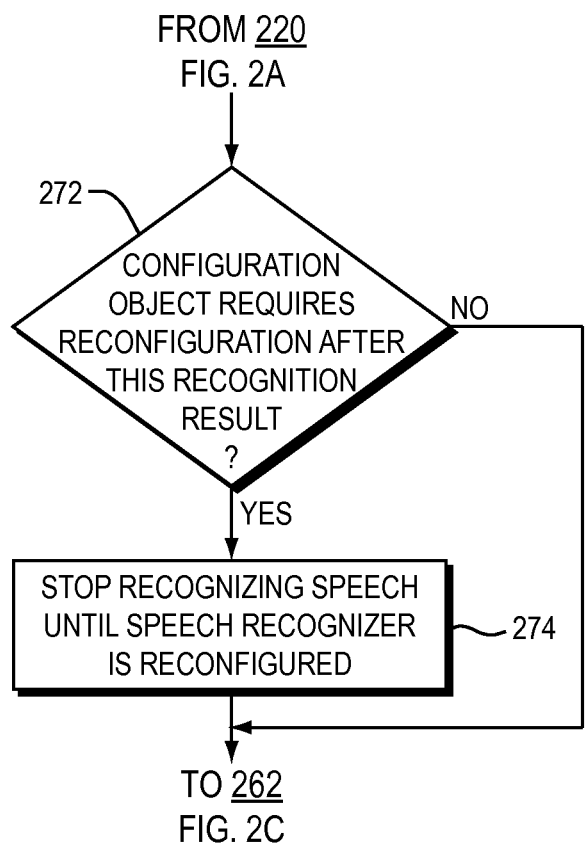
FIG. 2D is a flowchart of a method performed by a server-side recognizer to ensure that the recognizer is reconfigured after certain recognition results are obtained and before further recognition is performed according to one embodiment of the present invention.

Such results may be obtained as follows, as shown by the flowchart of FIG. 2C, which illustrates a method which may be performed by the server-side recognizer 120 as part of performing speech recognition on the audio segments in the processing queue (FIG. 2A, step 218). Each recognizer configuration state is assigned a unique configuration state identifier (ID). The speech recognition client 140 assigns integer values to configuration state IDs, such that if ID1>ID2, then the configuration state associated with ID1 is more recent than the configuration state associated with ID2. As described above with respect to FIG. 3, the speech recognition client 140 also provides tags 304d within each of the speech stream segments 302a-e which indicate the minimum required configuration state ID number that is required before recognition of that segment can begin.

When the server-side recognizer 120 retrieves the next audio segment from the processing queue 124 (step 262), the recognizer 120 compares the configuration state ID 136 of the recognizer's current configuration state 126 to the minimum required configuration ID specified by the retrieved audio segment's tag 304d. If the current configuration ID 136 is at least as great as the minimum required configuration ID (step 264), then the server 120 begins recognizing the retrieved audio segment (step 266). Otherwise, the server 120 waits until its configuration ID 136 reaches the minimum required ID before it begins recognizing the current speech segment. Since the method of FIG. 2C may be performed in parallel with the method 200 of FIG. 2A, the configuration ID 136 of the server-side recognizer 120 may be updated by execution of control messages 224 even while the method of FIG. 2C blocks in the loop over step 264. Furthermore, note that even while the server 120 waits to process speech from the processing queue 124, the server 120 continues to receive additional segments from the speech stream 110 and queue those segments into the processing queue 124 (FIG. 2A, steps 214-216).

As another example of ways in which the speech stream 110 and control stream 112 may be synchronized, the application 108, through the speech recognition client 140, may instruct the recognizer 120 ahead of time to stop recognizing the speech stream 110, or take some other action, upon producing any recognition result or upon producing a recognition result satisfying certain criteria. Such criteria may effectively serve as breakpoints which the application 108, through the speech recognition client 140, may use to proactively control how far ahead the recognizer 120 produces recognition results.

For example, consider a context in which the user 102 may issue any of the following voice commands: "delete," "next," "select all," and "open file chooser." In this context, a possible configuration, which may be specified by the configuration update object 404*b*, would be: <delete, continue>, <next, continue>, <select all, continue>, <open file chooser, stop>. Such a configuration instructs the server-side recognizer 120 to continue recognizing the speech stream 110 after obtaining the recognition result "delete," "next," or "select all," but to stop recognizing the speech stream 110 after obtaining the recognition result "open file chooser." The reason for configuring the recognizer 120 in this way is that production of the results "delete," "next," or "select all" do not require the recognizer 120 to be reconfigured before producing the next result. Therefore, the recognizer 120 may be allowed to continue recognizing the speech stream 110 after producing any of the results "delete," "next," or "select all," thereby enabling the recognizer 120 to continue recognizing the speech 104 at full speed (see FIG. 2D, step 272). In contrast, production of the result "open file chooser" requires the recognizer 120 to be reconfigured (e.g., to expect results such as "OK," "select file1.xml," or "New Folder") before recognizing any subsequent segments in the speech stream 110 (see FIG. 2C, step 274). Therefore, if the application 108, through the speech recognition client 140, is informed by the recognizer 120 that the result "open file chooser" was produced, the application 108, through the speech recognition client 140, may reconfigure the recognizer 120 with a configuration state that is appropriate for control of a file chooser. Enabling the application 108 to pre-configure the recognizer 120 in this way strikes a balance between maximizing the recognizer's response time and ensuring that the recognizer 120 uses the proper configuration state to recognize different portions of the speech 104.

Note that even if the recognizer 120 stops recognizing speech from the processing queue 124 as the result of a configuration "stop" command (step 274), the recognizer 120 may continue to receive speech segments from the speech stream 110 and to queue those segments into the processing queue 124 (FIG. 2A, steps 214, 216). As a result, additional segments of the speech stream 110 are ready to be processed as soon as the recognizer 120 resumes performing speech recognition.

As mentioned above, the techniques disclosed herein may be used in conjunction with one-way communication protocols, such as HTTPS. Such communication protocols are simple to set up on wide area networks, but offer little guarantee against failures. Failures may occur during a request between the client 130 and server 132 that may leave the application 108 in an ambiguous state. For example, a problem may occur when either party (client application 108 or server-side recognizer 120) fails while in the midst of a call. Other problems may occur, for example, due to lost messages to or from the server 118, messages arriving at the client 106 or server 118 out of sequence, or messages mistakenly sent as duplicates. In general, in prior art systems it is the responsibility of the speech recognition client 140 to ensure the robustness of the overall system 100, since the underlying communications protocol does not guarantee such robustness.

Embodiments of the present invention are robust against such problems by making all messages and events exchanged between the speech recognition client 140 and server-side recognizer 120 idempotent. An event is idempotent if multiple occurrences of the same event have the same effect as a single occurrence of the event. Therefore, if the speech recognition client 140 detects a failure, such as failure to transmit a command to the server-side recognizer 120, the speech recognition client 140 may re-transmit the command, either immediately or after a waiting period. The speech recognition client 140 and recognizer 120 may use a messaging application program interface (API) which guarantees that the retry will leave the system 100 in a coherent state.

In particular, the API for the speech stream 110 forces the speech recognition client 140 to transmit the speech stream 110 in segments. Each segment may have a unique ID 304*e* in addition to the start byte index 304*b* (initially 0 for the first segment), and either an end byte index 304*c* or a segment size. The server-side recognizer 120 may acknowledge that it has received a segment by transmitting back the end byte index of the segment, which should normally be equal to the start byte plus the segment size. The end byte index transmitted by the server may, however, be a lower value if the server could not read the entire audio segment.

The speech recognition client 140 then transfers the next segment starting where the server-side recognizer 120 left off, so that the new start byte index is equal to the end byte index returned by the recognizer 120. This process is repeated for the entire speech stream 110. If a message is lost (on the way to or from the server 118), the speech recognition client 140 repeats the transfer. If the server-side recognizer 120 did not previously receive that speech segment, then the server-side recognizer 120 will simply process the new data. If, however, the recognizer 120 previously processed that segment (such as may occur if the results were lost on the way back to the client 106), then the recognizer 120 may, for example, acknowledge receipt of the segment and drop it without processing it again.

For the control stream 112, all control messages 402*a-c* may be resent to the server 118, since each of the messages may contain an ID for the current session. In the case of the DecodeNext method, the speech recognition client 140 may pass, as part of the DecodeNext method, a running unique identifier to identify the current method call. The server 118 keeps track of those identifiers to determine whether the current message being received in the control stream 112 is new or whether it has already been received and processed. If the current message is new, then the recognizer 120 processes the message normally, as described above. If the current message was previously processed, then the recognizer 120 may re-deliver the previously-returned results instead of generating them again.

If one of the control messages 402*a-c* is sent to the server 118 and the server 118 does not acknowledge receipt of the control message, the client 140 may store the control message. When the client 140 has a second control message to send to the server 118, the client 140 may send both the first (unacknowledged) control message and the second control message to the server 118. The client 140 may alternatively achieve the same result by combining the state changes represented by the first and second control messages into a single control message, which the client 140 may then transmit to the server 140. The client 140 may combine any number of control messages together into a single control message in this way until such messages are acknowledged by the server 118. Similarly, the server 118 may combine speech recognition results which have not been acknowledged by the client 140 into individual results in the results stream 122 until such results are acknowledged by the client.

Among the advantages of the invention are one or more of the following. Embodiments of the present invention enable speech recognition to be distributed anywhere on the Internet, without requiring any special network. In particular, the techniques disclosed herein may operate over a one-way communication protocol, such as HTTP, thereby enabling operation even in restrictive environments in which clients are limited to engaging only in outbound (one-way) communications. As a result, embodiments of the present invention are broadly useful in conjunction with a wide variety of networks without requiring security to be sacrificed. Furthermore, the techniques disclosed herein may reuse existing web security mechanisms (such as SSL and, by extension, HTTPS) to provide secure communications between client 106 and server 118.

As mentioned above, one common restriction imposed on clients is that they may only use a limited range of outbound ports to communicate with external servers. Embodiments of the present invention may be implemented in such systems by multiplexing the speech stream 110 and the control stream 112 into a single stream 114 that can be transmitted through a single port.

Furthermore, outgoing communication may be required to be encrypted. For example, clients often are allowed to use only the standard secure, encrypted HTTPS port (port 443). Embodiments of the present invention can work over either a standard (unsecured) HTTP port or a secured HTTPS port for all of its communication needs—both audio transfer 110 and control flow 112. As a result, the techniques disclosed herein may be used in conjunction with systems which allow clients to communicate using unsecured HTTP and systems which require or allow clients to communicate using secured HTTPS.

The techniques disclosed herein are also resilient to intermittent network failures because they employ a communications protocol in which messages are idempotent. This is particularly useful when embodiments of the present invention are used in conjunction with networks, such as WANs, in which network drops and spikes are common. Although such events may cause conventional server-side speech recognition systems to fail, they do not effect results produced by embodiments of the present invention (except possibly by increasing turnaround time).

Embodiments of the present invention enable speech 104 to be transmitted from client 106 to server 118 as fast as the network 116 will allow, even if the server 118 cannot process that speech continuously. Furthermore, the server-side recognizer 120 may process speech from the processing queue 124 as quickly as possible even when the network 116 cannot transmit the results and/or the application 108 is not ready to receive the results. These and other features of embodiments of the present invention enable speech and speech recognition results to be transmitted and processed as quickly as individual components of the system 100 will allow, such that problems with individual components of the system 100 have minimum impact on the performance of the other components of the system 100.

Furthermore, embodiments of the present invention enable the server-side recognizer 120 to process speech as quickly as possible but without getting too far ahead of the client application 108. As described above, the application 108 may use control messages in the control stream 112 to issue reconfiguration commands to the recognizer 120 which cause the recognizer 120 to reconfigure itself to recognize speech in the appropriate configuration state, and to temporarily halt recognition upon the occurrence of predetermined conditions so that the application 108 can reconfigure the state of the recognizer 120 appropriately. Such techniques enable speech recognition to be performed as quickly as possible without being performed using the wrong configuration state.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

As described above, various methods performed by embodiments of the present invention may be performed in parallel with each other, in whole or in part. Those having ordinary skill in the art will appreciate how to perform particular portions of the methods disclosed herein to achieve the stated benefits, in various combinations.

The techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
   (A) at a speech recognition server:
      (A) (1) receiving a speech stream and a control stream from a client;
      (A) (2) using an automatic speech recognition engine in a first configuration state to recognize a first portion of the speech stream and thereby to produce a first speech recognition result;

(B) at the speech recognition server,
  (B) (1) analyzing a first control message in the control stream to determine whether the first speech recognition result satisfies a first predetermined criterion specified by the control stream;
  (B) (2) waiting until the automation speech recognition engine has been reconfigured before continuing to (C); and
(C) at the speech recognition server, responsive to receiving a second control message, using the automatic speech recognition engine in a second configuration state to recognize a second portion of the speech stream and thereby to produce a second speech recognition result.

2. The method of claim 1, wherein (A)(1) further comprises receiving the speech stream and the control stream in a multiplexed stream from the client.

3. The method of claim 2, wherein (A)(1) further comprises demultiplexing the multiplexed stream received from the client to produce the speech stream and the control stream.

4. The method of claim 1, wherein (A)(1) further comprises receiving an encrypted speech stream and an encrypted control stream from the client.

5. The method of claim 4, wherein (A)(1) further comprises decrypting the encrypted speech stream and the encrypted control stream.

6. A system comprising at least one non-transitory computer-readable medium having computer program instructions stored thereon, wherein the computer program instructions are executable by at least one computer processor to perform a method comprising:
(A) at a speech recognition server:
  (A) (1) receiving a speech stream and a control stream from a client;
  (A) (2) using an automatic speech recognition engine in a first configuration state to recognize a first portion of the speech stream and thereby to produce a first speech recognition result;
(B) at the speech recognition server,
  (B) (1) analyzing a first control message in the control stream to determine whether the first speech recognition result satisfies a first predetermined criterion specified by the control stream;
  (B) (2) waiting until the automation speech recognition engine has been reconfigured before continuing to (C); and
(C) at the speech recognition server, responsive to receiving a second control message, using the automatic speech recognition engine in a second configuration state to recognize a second portion of the speech stream and thereby to produce a second speech recognition result.

7. The system of claim 6, wherein (A)(1) further comprises receiving the speech stream and the control stream in a multiplexed stream from the client.

8. The system of claim 7, wherein (A)(1) further comprises demultiplexing the multiplexed stream received from the client to produce the speech stream and the control stream.

9. The system of claim 6, wherein (A)(1) further comprises receiving an encrypted speech stream and an encrypted control stream from the client.

10. The system of claim 9, wherein (A)(1) further comprises decrypting the encrypted speech stream and the encrypted control stream.

11. A computer-implemented method comprising:
(A) at a speech recognition server:
  (A) (1) receiving a speech stream and a control stream from a client;
  (A) (2) using an automatic speech recognition engine in a first configuration state to recognize a first portion of the speech stream and thereby to produce a first speech recognition result;
(B) at the speech recognition server, if the first speech recognition result satisfies a first predetermined criterion specified by the control stream, then waiting until the speech recognition engine has been reconfigured before continuing to (C); and
(C) at the speech recognition server, using the automatic speech recognition engine in a second configuration state to recognize a second portion of the speech stream and thereby to produce a second speech recognition result; and
(D) during (B), receiving by the speech recognition server, from the client, a third portion of the speech stream.

12. A system comprising at least one non-transitory computer-readable medium having computer program instructions stored thereon, wherein the computer program instructions are executable by at least one computer processor to perform a method comprising:
(A) at a speech recognition server:
  (A) (1) receiving a speech stream and a control stream from a client;
  (A) (2) using an automatic speech recognition engine in a first configuration state to recognize a first portion of the speech stream and thereby to produce a first speech recognition result;
(B) at the speech recognition server, if the first speech recognition result satisfies a first predetermined criterion specified by the control stream, then waiting until the speech recognition engine has been reconfigured before continuing to (C); and
(C) at the speech recognition server, using the automatic speech recognition engine in a second configuration state to recognize a second portion of the speech stream and thereby to produce a second speech recognition result; and
(D) during (B), receiving by the speech recognition server, from the client, a third portion of the speech stream.

\* \* \* \* \*

UNITED STATES PATENT AND TRADEMARK OFFICE
CERTIFICATE OF CORRECTION

PATENT NO. : 8,504,372 B2  
APPLICATION NO. : 13/563998  
DATED : August 6, 2013  
INVENTOR(S) : Eric Carraux et al.

Page 1 of 1

It is certified that error appears in the above-identified patent and that said Letters Patent is hereby corrected as shown below:

On the Title page, in item (63), under "Related U.S. Application Data", in column 1, line 2, delete "Aug. 17, 2011," and insert -- Aug. 02, 2011, --, therefor.

On Title page 2, in column 2, item (56), under "Other Publications", line 5, delete "vwww" and insert -- www --, therefor.

In the Specification

In column 1, line 8, delete "Aug. 17, 2011," and insert -- Aug. 02, 2011, --, therefor.

Signed and Sealed this  
Nineteenth Day of November, 2013

Teresa Stanek Rea  
*Deputy Director of the United States Patent and Trademark Office*